O. HYDE.
Elastic Tire for Traction Engines.
No. 111,213. Patented Jan'y 24, 1871.
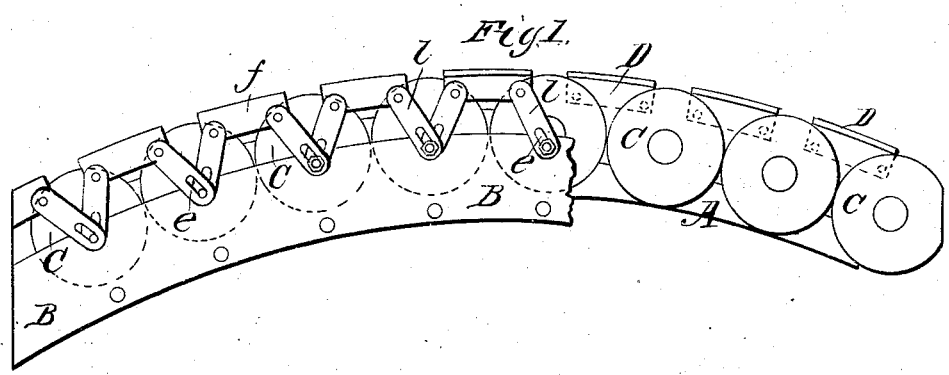
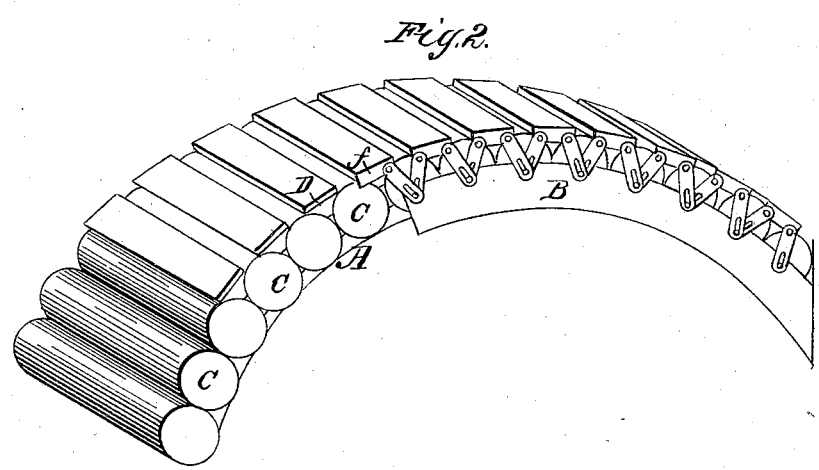
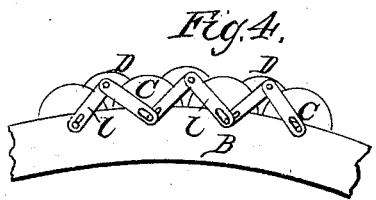
Witnesses.
Geo. H. Strong
Jno. L. Boone
Inventor.
Oliver Hyde
by Dewey & Co
his Attys.

United States Patent Office.

OLIVER HYDE, OF OAKLAND, CALIFORNIA.

Letters Patent No. 111,213, dated January 24, 1871.

IMPROVEMENT IN ELASTIC TIRES FOR TRACTION-ENGINES

The Schedule referred to in these Letters Patent and making part of the same.

*To all whom it may concern:*

Be it known that I, OLIVER HYDE, of Oakland, county of Alameda, State of California, have invented Improvements in Elastic Tires for the Wheels of Traction-Engines; and I do hereby declare the following description and accompanying drawing are sufficient to enable any person skilled in the art or science to which it most nearly appertains to make and use my said invention or improvements without further invention or experiment.

My improvements in elastic tires for the wheels of traction-engines relate to that class of rubber or elastic tires which are secured around the metallic tire of the wheel in blocks or segments; and It consists—

First, in the employment of elastic cylindrical blocks or blocks of a polygonal figure, which I secure in succession around the metallic tire so as to form a complete elastic tire for the wheel; and, Secondly, in an improved device for securing or binding these blocks to the metallic tire so that sufficient play is provided for the compression and expansion of the blocks.

In order to further explain my invention, the following description and accompanying drawing are referred to, in which—

Figure 1 is a side elevation.

Figure 2 is a perspective view.

Figure 3 is a cross-section, showing one of the blocks.

Figure 4 shows another form of the blocks.

A represents the rim or metallic tire of any wheel.

B B are vertical metallic rims, which are bolted or otherwise secured, one upon each side of the metallic tire A, so as to form side-plates extending outside of the metallic tire around the entire circumference of the wheel, thus forming a channel around the wheel of which the metallic tire A forms the bottom.

The rubber or other elastic blocks, C, which I employ, are cylindrical or polygonal in shape, and, when desired, may be provided with a hole running through their centers, in order to give greater contraction and expansion to the blocks.

These blocks are placed in the channel formed by the two rims or sides B and metallic tire A, across the face of the wheel, so that they shall lie close to one another.

It is evident that, when thus placed, a triangular space with curved sides will be left both below and above the point of junction of each two blocks; and in order to unite the whole into a compact tire, and to prevent the elastic cylinders or blocks from becoming displaced, I employ either wooden or metallic wedge-blocks, D, or a combination of wood and metal, which are made into the proper shape to fit into these recesses or spaces, so as to bind the cylinders in the channel when they are held in place by the proper fastenings.

Upon each side of these blocks D is cast, forged, or otherwise secured to it, a square or other-shaped side plate, *f*.

To each end of these side plates, or to their centers, as shown at fig. 4, is bolted a link, *l*, which extends downward at an angle, and has its opposite end bolted to the vertical rims B, at the sides.

The holes through which these latter bolts pass are slotted, as shown at *e*, in order to allow the bolts to move back and forth as the elastic blocks are compressed and returned to their original position.

By the above-described combination and arrangement of parts I am able to encircle the metallic tires of traction-wheels with a cheap, substantial, and thoroughly effective elastic tire, which can readily be fitted and easily repaired in cases of necessity.

Having thus described my invention,

What I claim, and desire to secure by Letters Patent, is—

1. The cylindrical or polygonal elastic blocks C, either solid or provided with a central hole, when used in the manner and for the purpose specified.

2. The wedge-blocks D, provided with the side-plates *f* and the slotted links *l*, in combination with the cylindrical or equivalent shaped elastic blocks C and vertical metallic rims B, substantially as and for the purpose above described.

OLIVER HYDE. [L. S.]

Witnesses:
JOHN L. BOONE,
GEO. H. STRONG.